(12) United States Patent
Trenchard et al.

(10) Patent No.: US 11,169,515 B2
(45) Date of Patent: Nov. 9, 2021

(54) EXTENDED DYNAMIC PROCESS SIMULATION

(71) Applicant: HONEYWELL INTERNATIONAL INC., Morris Plains, NJ (US)

(72) Inventors: Andrew John Trenchard, Romsey (GB); Meenakshi Sundaram Krishnaswamy, Edmonton (CA); Sanjoy Saha, Edmonton (CA)

(73) Assignee: Honeywell International Inc., Charlotte, NC (US)

( * ) Notice: Subject to any disclaimer, the term of this patent is extended or adjusted under 35 U.S.C. 154(b) by 51 days.

(21) Appl. No.: 16/725,273

(22) Filed: Dec. 23, 2019

(65) Prior Publication Data

US 2021/0191384 A1    Jun. 24, 2021

(51) Int. Cl.
G05B 23/02 (2006.01)
G05B 19/418 (2006.01)
G06N 3/08 (2006.01)
G06K 9/62 (2006.01)

(52) U.S. Cl.
CPC ..... *G05B 23/0283* (2013.01); *G05B 19/4184* (2013.01); *G05B 19/41885* (2013.01); *G06K 9/6256* (2013.01); *G06K 9/6277* (2013.01); *G06N 3/08* (2013.01)

(58) Field of Classification Search
None
See application file for complete search history.

(56) References Cited

U.S. PATENT DOCUMENTS

2016/0247129 A1    8/2016    Song et al.

*Primary Examiner* — Carlos R Ortiz Rodriguez
(74) *Attorney, Agent, or Firm* — Jetter & Associates, P.A.; Neil R. Jetter

(57) ABSTRACT

An Asset Performance Monitoring (APM) based-system includes an APM workflow engine receiving measured data values for dependent process variables from a process. A process and control simulator includes a dynamic operator training simulations (OTS) model. The APM workflow engine initializes the OTS model at a defined operating point at values for independent process variables from the measured data values to synchronize to the OTS model. The OTS model simulates at the defined operating point to generate model predicted values for key dependent process variables used to generate a trained data model that generates trained model predicted values for the key dependent process variables. The trained model predicted values are compared to the measured data values to generate symptom inputs processed by fault models to identify a suspected fault with the processing equipment/process. The APM workflow engine triggers an alert relating to inspection or maintenance action regarding the processing equipment/process.

21 Claims, 6 Drawing Sheets

| | FAULT MODEL 2 | FAULT MODEL 3 | FAULT MODEL n |
|---|---|---|---|
| FAULT MODEL 1 | 1 | 0 | 1 |
| FAULT MODEL 2 | | 3 | 2 |
| FAULT MODEL 3 | | | 0 |
| FAULT MODEL n-1 | | | 4 |

EXTENDED DYNAMIC PROCESS SIMULATION

FIELD

Disclosed aspects relate to models for enhancing the reliability of industrial plants.

BACKGROUND

The reliability of an industrial plant or process unit referred to herein as an industrial processing facility tends to decrease over its operating period, so there is a need to continuously monitor the performance of the process and the processing equipment to recognize symptoms of failure as early as possible. This monitoring enables identifying faults that allows taking timely corrective actions to maintain higher reliability which improves the utilization of capital expense (Capex) and operating expense (Opex).

A key challenge to solving this Asset Performance Monitoring (APM) problem is identifying the most effective limiting parameters. The most effective limiting process parameters are the variables that have the dominant impact on the overall performance of the process plant limiting the ability of the plant to meet its production rate, product quality, energy efficiency or run length (time between plant shutdowns). For example, limiting process variables can comprise a catalyst activity coefficient, a fouling factor, and certain operating conditions.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize dynamic models designed for operator training simulations (OTS) can be used as a digital twin for an industrial processing facility (IPF) to solve the above-described problem with APM regarding how to monitor the performance of the process and the processing equipment to automatically recognize symptoms of failure, which enables alerts to be issued so that timely actions are taken to help avoid failures and thus maintain higher IPF reliability. The term "OTS" defines the application of the models (operator training) more than the type of underlying model. However, within the processing industry, as known in the art, first principles models (that are based on fundamental chemistry and physics equations and correlations) are used for OTS models. Accordingly, the term OTS and first principles models are equivalent throughout this Disclosure. The OTS models are not modified in any significant way for use in the APM solution disclosed herein.

The disclosed APM solution provided herein uses two different types of models. The APM solution starts with first principles models in the OTS models, and then derives simpler data regressed models from the OTS models, since it is recognized herein that data regressed models are easier to use and deploy on-line. As known in statistics, regression analysis is a form of predictive modelling which investigates the relationship between a dependent (target) and independent variable(s) (also known as a predictor). This disclosed approach for APM offers significantly better ROI to an industrial processing facility for the OTS and APM investment.

One disclosed embodiment comprises a method of APM that includes providing measured data values for a set of dependent process variables to an APM workflow engine, wherein the measured data is obtained from a process run by an IPF having at least one process controller and processing equipment configured together to run the process. The APM workflow engine initializes a dynamic OTS model comprising first principles models specified by independent process variables at a defined operating point comprising a set of independent process variable values selected from the measured data values to synchronize the OTS model to the defined operating point.

The OTS model is run at the defined operating point to generate model predicted values for a set of key ones of the set of dependent process variables. The model predicted values are used to train a data model, which is then deployed for generating trained model predicted values for the set of key dependent process variables. The trained model predicted values are compared to the measured data values to identify statistically significant deviations, then to generate symptom inputs from the statistically significant deviations that are provided to fault models. The fault models identify at least one suspected fault with the processing equipment or a suspected fault with the process. The suspected fault triggers an alert relating to an inspection or a maintenance action regarding the processing equipment or regarding the process.

DETAILED DESCRIPTION

Figure 1:
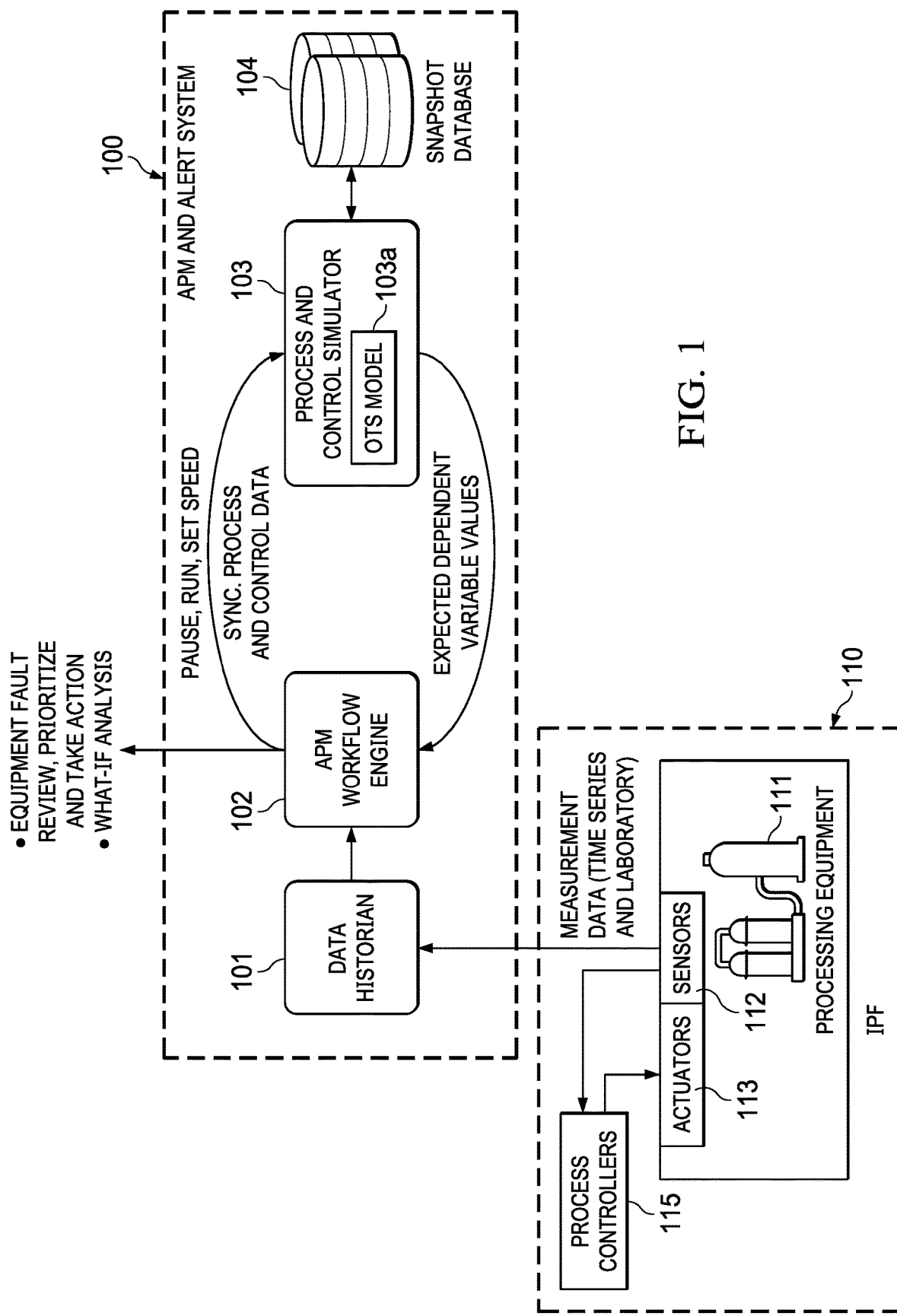
FIG. 1 is a depiction of a disclosed APM and alert system coupled to an IPF that includes a process controller and processing equipment configured to run a process, where the APM and alert system identifies a set of key dependent process variables, uses these key dependent process variables to monitor the performance of the process and processing equipment to recognize symptoms of failure, and issues alerts when symptoms of failure are identified to enable taking timely actions to maintain higher IPF reliability, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

As used herein an IPF runs an industrial process involving a tangible material that disclosed aspects apply. For example, oil and gas, chemical, beverage, pharmaceutical, pulp and paper manufacturing, petroleum processes, electrical power, and water, where the tangible material is involved in processing. An IPF is distinct from a data processing system that only performs data manipulations.

FIG. 1 is a depiction of a disclosed APM and alert (or notification) system 100 coupled to an IPF 110 that includes process controllers shown as 115 controlling processing equipment 111 which runs an industrial process. The APM and alert system 100 identifies a set of key dependent process variables, that enables real-time (or off-line) monitoring of the performance of the process and processing equipment 111. This enables recognizing symptoms of failure, which allows alerts to be generated so that more timely corrective actions (e.g., inspections or equipment repairs) can be taken to help avoid processing equipment or process failures to maintain higher IPF 110 reliability.

Measured data values for a set of dependent process variable (process data) obtained from the processing equipment 111 is sensed by sensors 112, then collected and stored in a data historian 101 that comprises at least one memory which may be located either on-premise in the IPF 110, or can be located in the cloud. The process controllers 115 besides being coupled to the sensors 112 are coupled to actuators 113, where the actuators 113 are coupled to directly control the processing equipment 111.

The measured process data in the data historian 101 is used by an APM workflow engine 102 (e.g. a UNIFORMANCE ASSET SENTINEL from Honeywell International Inc.). The APM workflow engine 102 continuously monitors the processing equipment 111 and the process health, and is used in disclosed methods to initialize an OTS model 103a run by a process and control simulator 103. The process and control simulator 103 is configured as a digital twin of the IPF 110 for use by the APM workflow engine 102 at a defined operating point comprising a set of measured process conditions (actual measured data received from the sensors 112). The measured data values can comprise current conditions, averaged current conditions, or a historical set of conditions.

A "digital twin" as used herein and as known in the art is a digital replica of a real physical entity. By bridging the physical and the virtual world, data is transmitted seamlessly allowing the virtual entity to exist simultaneously with the physical entity.

The APM workflow engine 102 is also shown receiving expected dependent variable values (also known as responding variables) from the process and control simulator 103. The respective manipulated variables in contrast to a dependent variable/responding variable refers to a variable that is controlled and typically changed (by actuators 113 controlled by a process controller 115) over the course of time. A manipulated variable may also be called an independent variable. The responding variable is thus the response of the manipulated variable that is sensed by sensors 112.

The expected dependent variable values together with the measurement data (of the dependent variables) from the data historian 101 are used to identify equipment anomalies, aggregate into faults with a priority, and recommend corrective actions. The corrective actions can be tested virtually using the OTS process control simulator 103, running in the conventional operator training simulation mode. The APM workflow engine 102 also provides measured process and control data to the processing and control simulator 103 so that they are synchronized to the same set of data (a defined operant point). The APM workflow engine 102 also manages the operation of the process and control simulator 103 in terms of starting, pausing, and stopping the running of the process and control simulator 103, setting the speed and loading initialization snapshots from the snapshot database 104 to the process and control simulator 103.

The synchronized OTS model 103a is run at the defined operating point (the conditions specified to the OTS model 103a by the APM workflow engine 102) to generate model predicted values for a set of key ones of the dependent process variables. The APM workflow engine 102 orchestrates the perturbation of the independent variables and the capture of the dynamic response of the dependent (responding) variables as a sequence of time series values. These model predicted process values generated by the OTS model 103a are used to generate a trained data model, valid at the defined operating point, where the trained data model is then deployed on-line to generate trained model predicted values for the key dependent process variables. Alternatively, the trained data model can be deployed off-line.

The trained model predicted values for the set of key dependent process variables are then compared by the APM workflow engine 102 against the measured data values to identify any statistically significant deviations (that are deviations which are significantly greater (such as ≥a predetermined % outside a limit) than the prediction deviations observed when training the data model to the OTS model) to generate symptom inputs from the statistically significant deviations that are provided to the fault models. The fault models are generally configured from experience and by running what-if scenarios on the OTS model 103a offline and capturing the fault signatures into a suitable memory. The fault models in turn are used to used identify likely faults with the processing equipment or process that may be event logged to prompt equipment inspection and maintenance actions. The suspected fault can trigger an alert relating to an inspection or maintenance action regarding the process equipment or the process.

The ability of disclosed re-purposing of OTS models 103a for APM based on the ability to synchronize the OTS models to a selected (e.g., current) operating point gains the benefit of the non-linear rigor of the first principles dynamic models. The synchronization of the OTS models 103a to a current operating point workflow can be provided as described below:

1. The modes of regulatory control loops in the IPF 110 are read from the (process controllers 115 of) IPF 110 that generally comprises a connected distributed control system (DCS), or read from a data historian 101 if the OTS model 103a is being synchronized to a historical operating point;

2. The modes of the corresponding regulatory control loops within the OTS model 103a are set to the states read from the DCS or from the data historian 101;

3. The setpoints of the regulatory control loops that are in primary control (specifically the highest loop in regulatory cascade in automatic (AUTO mode) are used to set the corresponding setpoints of the loops in the OTS simulation run by the OTS model 103a.

a. These primary loops may in fact be under supervisory control of another application such as Procedural Operations or Multivariable control, but the setpoint of these loops still represents the boundary setpoint value within the scope of the OTS model 103a.

b. If all the loops in a cascade are in the manual (MAN) mode, the output of the lowest loop in the cascade is used to set the output of the corresponding loop in the OTS model 103a.

c. If the primary control loop has a saturated output (i.e. at 0% or 100% of range), then the process value (PV)

of the loop should be used as the OTS model specifying value, i.e. to emulate setpoint tracking.

4. The properties of the boundary streams to the OTS model 103a are based on the most recent available information or an inference derived from another available signal(s).

5. The simulation model is run by the OTS model 103a as needed, either to steady state or for a designated simulation time.

This approach does not require all the generated dynamic OTS model 103a model predicted values of the key process variables to match the actual DCS or historical actual data values, only that setpoints (SP) and PV's of the primary loops in the control system (the independent variables of the model). The latitude (floating outputs) of the simulated control system enables there to be some model mismatch between the OTS model 103a variable values and the actual process data (such as provided by the data historian 101).

Figure 2:
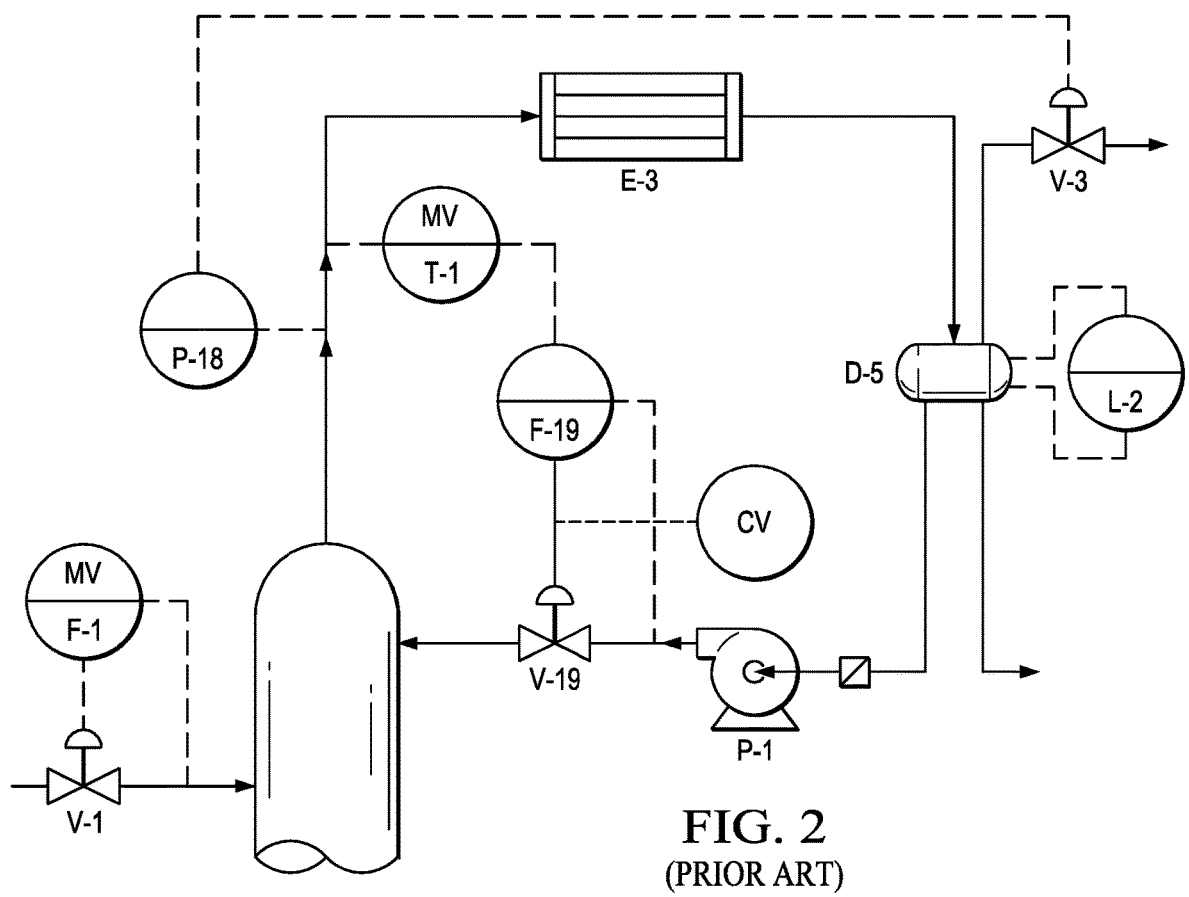
FIG. 2 depicts an example overhead section of a distillation column.

In some circumstances, however, the OTS model 103a may not be able to converge its solution at the target set of process conditions. The most likely reason for this is that the process behavior has changed significantly and the OTS model 103a has not been updated to reflect this significant change. In this case the OTS model 103a generally cannot be used, so that the existing data model instead will generally be used. An added step of the synchronization workflow OTS model 103a is generally therefore added to perform a gross error check:

1. To determine if the OTS model 103a runs without a simulation diagnostic error (such as reverse flow or incompatible physical property state); and to determine 2. The difference between key variables in the actual process data and the corresponding variables in the simulation set are within tolerance of user specified bounds. For example, see FIG. 2 which illustrates a column overhead section of a conventional distillation column. Shown as pressure is P-x, and the valves are shown as V-x.

Under normal circumstances, specifying the column feedrate and overhead temperature setpoints (F-1 and T-1) should result in a simulated reflux flow (F-19) value from the OTS model 103a that is broadly comparable with the actual process data value, especially if the reboiler duty and measured ambient air temperature are used as a model inputs to the OTS model 103a. However, in the extreme case that pump P-1 has failed, the simulation values will not be able to match the process values. This process simulation mismatch is itself a first level indicator of a gross process anomaly that can be used for fault detection.

Another disclosed aspect is regarding a frequent requirement of the OTS model 103a to move to a new defined operating point, and then start simulating the dependent process variables from that new operating point to generate updates for the model predicted values. Transitioning some OTS models 103a too rapidly from one operating point to another significantly different operating point can lead to simulation instabilities. Moving the OTS models 103a too slowly to a different defined operating point can take a long time and consume significant computing overhead. A hybrid approach disclosed herein uses a combination of "nearest-neighbor" initial simulation snapshots together with a fast initialization routine.

Figure 3:
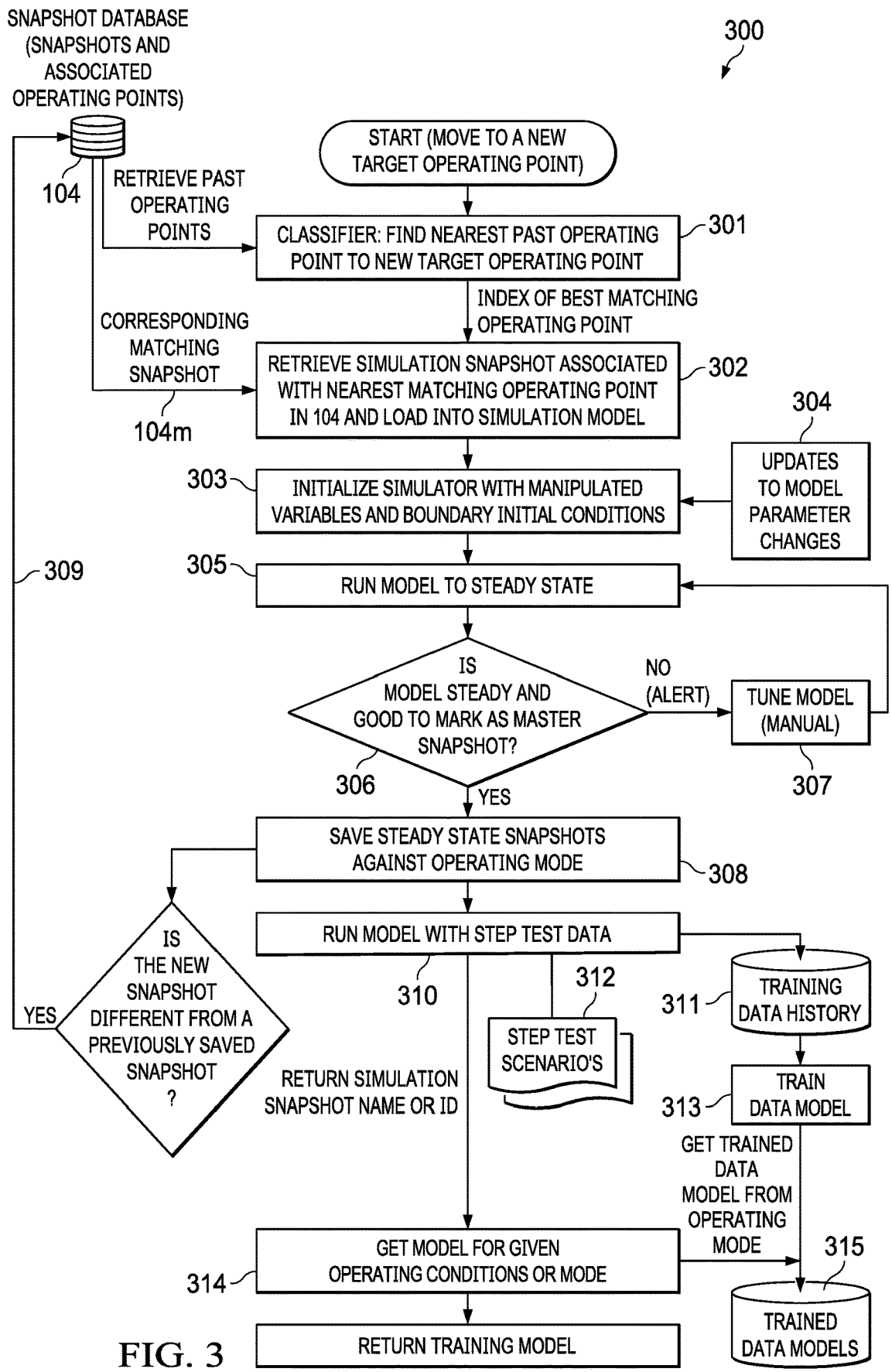
FIG. 3 depicts for each main operating point, a simulation being run to steady state and the resulting simulation state saved as a separate snapshot in a snapshot database.

The example implementation workflow shown as method 300 in FIG. 3 relies on a previously generated library of historical operating points (specified in terms of data values for key measured PV's, e.g. feedrate, reactor temperature, quality targets, and in some cases feed quality) stored in a snapshot database 104. For each operating point, the OTS simulator model 103a is run to steady state and the model state is saved as a snapshot in the snapshot database 104 (a saved state of the model and the simulated variables). This library of snapshots in the snapshot database 104 and associated operating points is extended as the process moves to different operating regions. For very large scope OTS models 103a the number of potential key process variables will generally be large, which would increase the dimensionality of the simulation and classification problem. However, the goal in this case is not to get an exact match of a priori simulation snapshot to the defined operating point, but rather to provide the dynamic simulation a "head start" in moving towards the defined operating point.

In real-time, when the simulation run by the OTS model 103a is determined to be needed to move to a new operating point, a classifier (e.g. a K-nearest neighbor classifier) shown in step 301 is used to determine the best initial snapshot 104m from the snapshot database 104, with the best initial snapshot 104m representing a stored operating point that is determined to be the closest to the new target operating point. In step 302 the best initial snapshot 104m is loaded into the OTS model which restores the prior saved stated and simulated values.

In step 303 the following initialization sequence can be applied to the loaded initial snapshot 104m:

1. Freeze the OTS model 103a;
2. Switch the simulated control loops to manual mode;
3. Move the corresponding simulated controller outputs to the values defined by new target operating point (i.e. read from the historian 101), shown as block 303.
4. Update the OTS model 103a with any model parameter changes, updated since the simulation snapshot was initially created (updating the stored snapshot) shown a step 304;
5. Unfreeze the OTS model 103a and run the simulation generally for 2-5 simulation steps to enable the simulation to stabilize with the control loop changes;
6. Freeze the OTS model 103a;
7. Set the simulated control loop modes to those defined at the new operating point;
8. Set the simulated control loop setpoint values to the corresponding values defined by the new target operating point; and
9. Run the OTS model 103a to steady state shown a step 305.
10. Step 306 comprises determining whether the model is steady and the new snapshot (new steady-state operating point) is determined to be good it is marked as a master snapshot. If the model is found to be steady and good to mark as a master snapshot, step 308 is reached and comprises saving the state snapshots against the operating mode. If the new steady state operating point is significantly different from a previously saved snapshot (generally defined in terms of a minimum normalized multivariate distance from a previously saved snapshot operating point), step 307 is reached comprises manual model tuning and then step 305 comprising running the model to steady state is then repeated. After step 308, if the new steady-state operating point is determined to be different from the previously saved snapshot, the new snapshot is saved in step 309 to the snapshot database 104;
11. The new simulation point snapshot can be saved to a temporary cache to execute step 309.

Step 310 comprises perturbing the OTS model 103a by running the model with step test data provided by step test scenario block 312, that has been initialized to the new operating point, for each of the independent variables in the model, where the APM workflow engine 102 orchestrates the following steps:

1. The new simulation point snapshot is loaded to the OTS model 103a;
2. The independent variable is stepped and the change is persisted for the steady state duration of the simulated process TSS. The step size of the moves and TSS is persisted in the step test scenario training data history database 311. The step size is engineering configurable, but defaults to 5% of the normal operating range of the independent variables.
3. The values of the independent variables and key dependent variables for the simulated duration of the test are stored as training data history 311.

On completion of the above steps, the training data history 311 is used to generate a train a data model 313. Step 314 comprises getting a model for a given operating conditioner mode. The train data model from block 313 together with the model were given operating conditions are mode from block 314 are both provided to generate train data models shown at block 315. The newly trained data model can be stored in a trained data model archive. The resulting train data model is then deployed on-line for performance monitoring, where as described above trained model predicted values generated by the trained data model are compared to the measured data values to identify statistically significant deviations, and then symptom inputs are generated from statistically significant deviations that are provided to fault models.

An overall benefit of disclosed methods and systems is a faster and stable transition between simulation operating points. In situations where there is no historical operating data stored in the data historian 101 the library of simulation snapshots in the snapshot database 104 which can be built and classified over time.

A further disclosed aspect comprises Automated Fault Model development. Most OTS models 103a have preconfigured malfunction modes, with example malfunction modes being such as valve actuator sticking, pump overheating, and loss of compressor efficiency. Furthermore, additional malfunctions in support of specific operator training scenarios may be configured as part of an OTS model project deployment. The equivalent malfunctions are generally rare and difficult to detect in normal operating data, but they can be simulated by the OTS model 103a.

Figure 4:
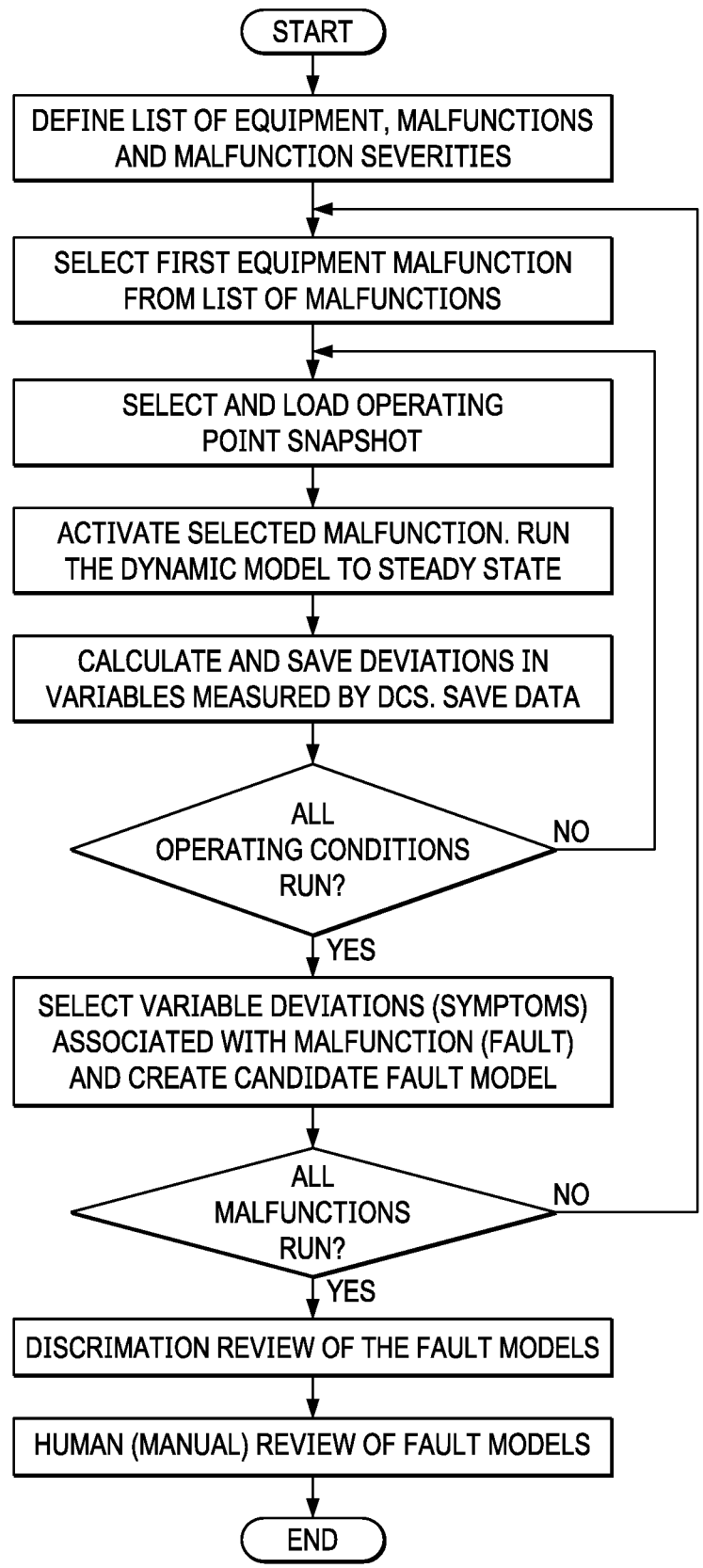
FIG. 4 depicts the automated development of fault models.

These malfunctions can be triggered in an offline mode to automate the development of fault symptoms models, as shown in FIG. 4. The workflow starts with a candidate list of malfunctions, in terms of the equipment item, type of malfunction, and malfunction severity. Each malfunction is tested over a range of operating points (as simulated as shown in FIG. 3), to derive a representative model.

Having selected a specific malfunction, the next step is to select one of the operating points and load the associated simulation snapshot. The malfunction is introduced into the simulation and the consequences determined, in terms of the trajectories and steady state deviations of the process variables, deviations from the initial steady state conditions of the simulation. Finally, these simulation results are saved.

The simulation process is repeated for all the selected operating points and malfunctions. This process is completely automated to enable the exercise to be repeated after OTS model 103a updates. For each malfunction, candidate fault models are derived by classifying the statistically significant symptoms deviations (steady state deviation and rate-of-change) over the range of operating points. The raw simulated variable values and calculated metrics based on templated rules can used as candidate symptoms.

The assessment of statistical significance can be based on:
1. The magnitude of the simulated variable deviation (and rate-of-change) relative to the noise amplitudes of the measured process variables in the plant data set. The range of noise frequencies important to the analysis are bounded by the response time of the symptoms to the malfunctions;
2. The speed of response, i.e. fast indicators are preferred to very slow indicators; and
3. Whether the symptom is sustained or is transitory. Starting limits for the symptom thresholds are identified for the range of operating conditions.

Figure 5:
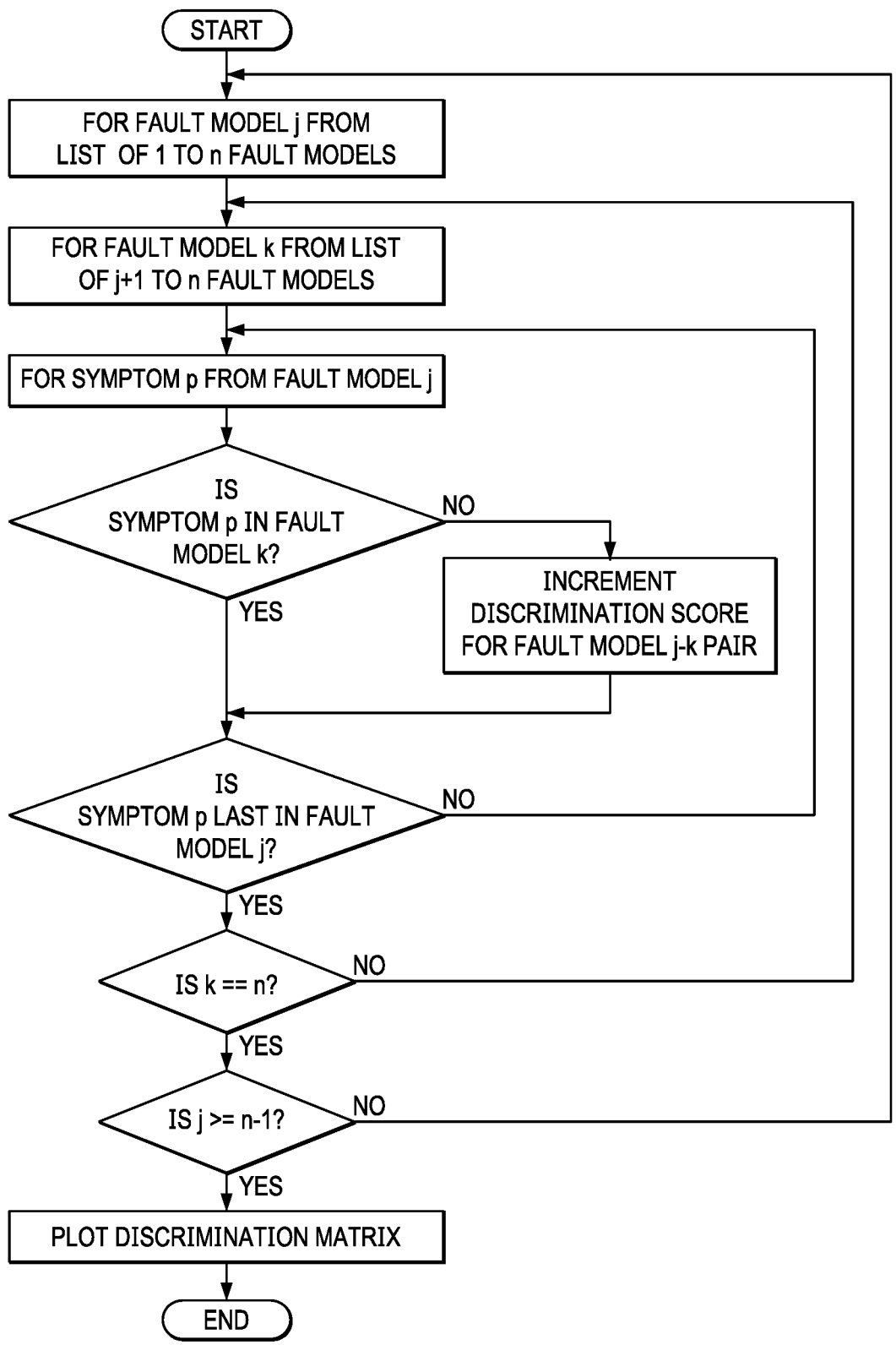
FIG. 5 shows a flow for discriminating fault models.

Finally, the discrimination ability of the candidate fault models is evaluated by assessing the similarity of the candidate fault model for the different simulated malfunctions. For example, if one fault model is a sub-set of another fault model, then the two faults are hard to discriminate. Likewise, if two fault models the same except for one different symptom input, then they have a weak discrimination. FIG. 5 illustrates a discriminating fault model process.

The similarity of the fault models can be estimated by iterating through the list of fault models and identifying the number of unique symptoms in one fault model versus the other fault models. For every unique symptom in a fault model comparison, the discrimination score can be incremented. The results can be plotted in a matrix form, as illustrated in the table shown in FIG. 6 which shows an example discrimination matrix.

This approach helps the engineer or technician to manually select fault models for implementation in the APM workflow engine 102 solution. An engineer or technician can drill down to the simulation results developed by the workflow defined in FIG. 4 to further support the decision-making process.

There are further disclosed aspects relating to an integrated machine and process self-learning using dynamic process simulation model-based system to improve overall plant reliability. This aspect recognizes physics-based models often become out of synchronization with a plant and the known techniques and technology are complex and error prone (reconciliation and parameter estimation). Moreover, machine learning or pattern-based models often generate false positives and users will develop low confidence on the model reliability, manual tuning and configuration efforts required to deploy and maintain is quite high and so it becomes a scalability challenge, and systematic integration of process and equipment condition model missing can lead to partial learning and the generating of false alarms.

Figures 6, 7:
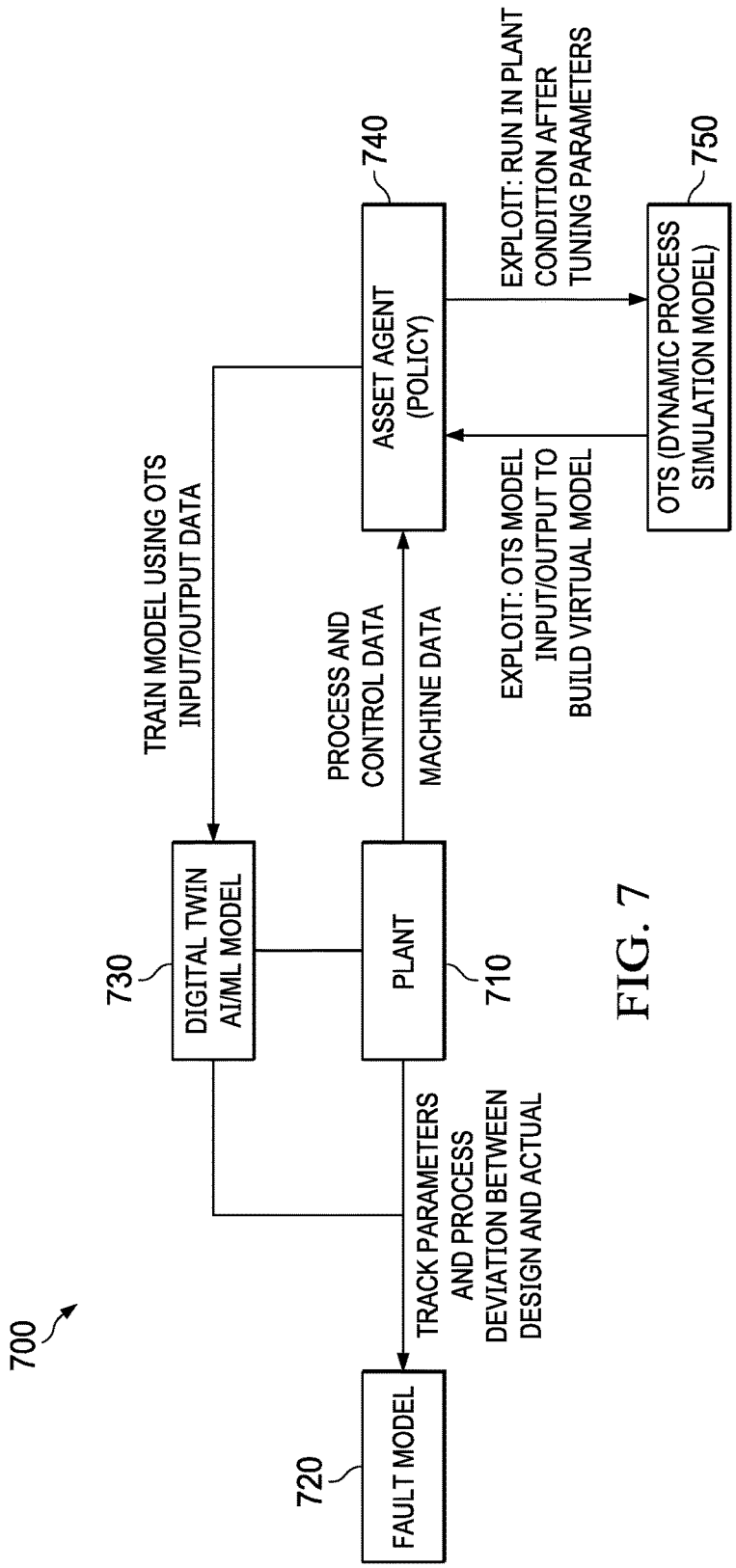
FIG. 6 shows an example discrimination matrix.
FIG. 7 shows an example integrated machine and process self-learning using dynamic process simulation model-based system.

Considering the complexity and number of variables (typically greater than 10) to tune in a typical process unit or a plant for a synchronization there is a need for a self-learning and tuning of the digital twin model itself. FIG. 7 shows an example integrated machine and process self-learning using dynamic process simulation model-based system 700. System 700 includes a plant 710, a fault model library 720, a digital twin AI/machine learning (ML) data model 730, an asset agent library 740, and an OTS model (dynamic process simulation model) 750.

The asset agent library 740 is a component which will have steps and rules to self-train the digital twin model 730 through following example steps:
1) Periodic Self-Training of the AWL data model 730:
    A Self-Training digital twin AI or ML model for each unit operation or unit using a dynamic OTS simulator when a new operating region or higher deviation between prediction and actual is observed or through a scheduled interval.

2) Synchronize the OTS model with the environment or the plant. Estimate bias to design parameters used in OTS model using techniques such as a recurrent neural network (RNN) as an example technique to update the digital twin AI data model;

3) Use machine condition data to update equipment parameters.

The Fault Model Library 720 tracks the model deviation between estimated and actual process and equipment KPI and generates fault and symptoms along with recommendation, and priority to drive action at appropriate time and avoids failures. Regarding the digital twin AWL model 730, the dynamic process simulation model 750 is explored for different plant loads and exploit the OTS models results along with input to self-train the digital twin (artificial intelligence (AI)/ML) model 730. This digital twin AI/ML model 730 combines machine condition data along with process input and output data from OTS. Hence, one can track both a reliability problem of asset and narrow down to specific process or equipment problems.

By applying AI concepts to push the digital twin models (data model and physics-based model) adapts to current plant conditions including machine condition, which enables the below described features:

1: The Digital twin model used to predict both process and equipment condition problems by adopting ai methodology and deep learning techniques. Benefits include self-learning and integrated process and equipment digital twin model.

2: Leverage machine condition data such as lubricant oil temperature, bearing temperature, vibration to estimate process model parameters such as mechanical efficiency to better synchronize the model with plant. Benefits include an Effect of machine condition data on the process and the control is integrated.

3: Deliver synchronization policy model library for each of the asset which can be unit or equipment Example valves, pumps, reactor, FCC unit. Benefits include Granular control of the error between prediction or design OTS model and actual plant.

4: Self learning and refining the policy through Explore and exploit methodology on dynamic OTS process and control model to build design or expected model behavior. Benefits include 1) Techniques such as recurrent neural network and other deep learning algorithms used for self-learning capability with time context helps to adapt the model with any degrading process or equipment behavior and thus reduces the difficulties in synchronizing the model with plant and 2) Effort to deploy model is reduced as there is no requirement for manual tuning or training required 5: Feedback on the event detected by digital twin model and periodic manual observation in field is used by voting system to generate reliable alert. Benefits include improved reliability of the outcome and reduction in false alarms.

Business advantages include the digital twin self-learning AWL, model 730 for APM improving reliability of a plant by providing advisory support in real-time. The AWL, model periodically learn by exploring and exploiting the dynamic process & control simulation model using synchronization simple policy developed for each Asset Template to address the model mismatch with the actual operations of the plant.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of Asset Performance Monitoring (APM), comprising:
    providing measured data values for a set of dependent process variables to an Asset Performance Monitoring (APM) workflow engine obtained from a process that is run by an industrial processing facility (IPF) having at least one process controller and processing equipment configured together to run the process;
    the APM workflow engine initializing a dynamic operator training simulation (OTS) model specified by a set of independent process variables at a defined operating point comprising a set of values for the set of independent process variables selected from the measured data values to synchronize the OTS model to the defined operating point;
    running the OTS model at the defined operating point to generate model predicted values for a set of key dependent process variables selected from the set of dependent process variables;
    using the model predicted values to generate a trained data model;
    the trained data model generating trained model predicted values for the set of key dependent process variables;
    comparing the trained model predicted values to the measured data values to identify statistically significant deviations and then generating symptom inputs from the statistically significant deviations that are provided to fault models, and
    the fault models identifying at least one suspected fault with one of the processing equipment or with the process.

2. The method of claim 1, wherein the trained data model is deployed on-line so that the trained model predicted values are real-time trained model predicted values.

3. The method of claim 1, wherein the trained data model is deployed off-line, further comprising using historical measured values of the independent variables to provide the trained model predicted values, further comprising comparing the trained model predicted values to the historical measured values.

4. The method of claim 1, further comprising the suspected fault triggering an alert relating to an inspection or a maintenance action regarding one of the processing equipment or regarding the process.

5. The method of claim 4, further comprising a user implementing the inspection or the maintenance action.

6. The method of claim 1, further comprising moving the OTS model to an updated operating point, and then simulating to generate updates for the model predicted values.

7. The method of claim 6, wherein the simulating to generate the updates for the model predicted values at the updated operating point further comprises using a combination of nearest-neighbor initial simulation snapshots stored in a snapshot database that are generated from simulations using different operating points provided by the OTS model together with an initialization routine.

8. The method of claim 1, further comprising developing an automated fault model using configuration information generated by the OTS model by simulating to generate simulated malfunctions and observing symptoms in the simulated malfunctions, and then classifying a pattern of observed symptoms with the simulated malfunctions.

9. The method of claim 1, further comprising identifying the set of dependent process variables, wherein the set of dependent process variables identified are dependent on conditions established by the defined operating point.

10. The method of claim 1, wherein the using the model predicted values to generate the trained data model further comprises using machine condition data regarding the processing equipment to add additional insight from additional data that is not covered by the OTS model.

11. The method of claim 8, further comprising automatically tuning the OTS model using self-learning and refining a policy through an explore and exploit methodology, wherein the patterns of observed symptoms for a known event are used to update pattern recognition logic for future events.

12. The method of claim 1, further comprising generating feedback on the suspected fault of the processing equipment or process detected by the OTS model and periodic manual observation on a work floor of the IPF having the processing equipment using a voting system for generating an alert for the identifying of the suspected fault.

13. An Asset Performance Monitoring (APM) and alert system for a process that is run in an industrial processing facility (IPF), comprising:
- an APM workflow engine configured for receiving measured data values for a set of dependent process variables obtained from the process, the IPF having at least one process controller and processing equipment configured together to run the process;
- a process and control simulator including a dynamic operator training simulations (OTS) model specified by independent process variables;
- the APM workflow engine configured for initializing the dynamic OTS model at a defined operating point comprising a set of values for the set of independent process selected from the measured data values to synchronize the OTS model to the defined operating point;
- the OTS model for running a simulation at the defined operating point to generate model predicted values for a set of key dependent process variables from the set of dependent process variables;
- a trained data model generated from the model predicted values trained model predicted values for the set of key dependent process variables;
- APM workflow engine comparing the trained model predicted values to the measured data values to identify statistically significant deviations, then generating symptom inputs from the statistically significant deviations that are provided to fault models, wherein the fault models are for identifying at least one suspected fault with the processing equipment or a fault with the process, and
- wherein the APM workflow engine responsive to a suspected fault is for triggering an alert relating to an inspection or a maintenance action regarding one of the processing equipment or regarding the process.

14. The system of claim 13, wherein the trained data model is deployed on-line so that the trained model predicted values are real-time trained model predicted values.

15. The system of claim 13, wherein the trained data model is deployed off-line, wherein historical measured values of the independent variables are used for the measured data values to provide the trained model predicted values, wherein the trained model predicted values are then be compared with the historical measured values.

16. The system of claim 13, wherein the OTS model is movable to an updated operating point, and then for simulating to generate updates for the model predicted values.

17. The system of claim 16, wherein the simulating to generate the updates for the model predicted values at the updated operating point further comprising using a combination of nearest-neighbor initial simulation snapshots that are generated from simulations using different operating points provided by the OTS model together with an initialization routine.

18. The system of claim 13, further comprising automated fault model development using configuration information generated by the OTS model by simulating to generate simulated malfunctions and observing symptoms in the simulated malfunctions, then classifying a pattern of observed symptoms with the simulated malfunctions.

19. The system of claim 13, wherein the trained data model is generated from the model predicted values, and machine condition data regarding the processing equipment is used to add additional insight from additional data that is not covered by the OTS model.

20. The system of claim 13, wherein the OTS model is an automatically tuned OTS model that is tuned using self-learning and refining a policy through an explore and exploit methodology, wherein the patterns of observed symptoms for a known event are used to update pattern recognition logic for future events.

21. The system of claim 13, wherein the identifying at least one suspected fault further utilizes feedback on the suspected fault of the processing equipment or the process detected by the OTS model and periodic manual observation on a work floor of the IPF having the processing equipment used by a voting system for generating the alert for the identifying of the suspected fault.

* * * * *